United States Patent
Andrade et al.

(10) Patent No.: US 8,326,821 B2
(45) Date of Patent: Dec. 4, 2012

(54) TRANSFORMING RELATIONAL QUERIES INTO STREAM PROCESSING

(75) Inventors: Henrique Andrade, Croton-on-Hudson, NY (US); Bugra Gedik, Hawthorne, NY (US); Martin J. Hirzel, Hawthorne, NY (US); Robert Soule, Hawthorne, NY (US); Hua Yong Wang, Beijing (CN); Kun-Lung Wu, Hawthorne, NY (US); Qiong Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 12/868,344

(22) Filed: Aug. 25, 2010

(65) Prior Publication Data

US 2012/0054173 A1 Mar. 1, 2012

(51) Int. Cl.
 *G06F 7/00* (2006.01)
 *G06F 17/30* (2006.01)

(52) U.S. Cl. ........ 707/713; 707/714; 707/715; 707/718; 707/736; 707/758

(58) Field of Classification Search .................. 707/705, 707/713, 714, 715, 718, 736, 758, 759, 765, 707/769, 999.3, 999.4, 999.5
See application file for complete search history.

(56) References Cited

U.S. PATENT DOCUMENTS

| | | | |
|---|---|---|---|
| 7,310,638 B1 | 12/2007 | Blair | |
| 7,739,264 B2* | 6/2010 | Jones et al. | 707/713 |
| 7,941,413 B2* | 5/2011 | Kashiyama et al. | 707/696 |
| 8,126,870 B2* | 2/2012 | Chowdhuri et al. | 707/713 |
| 2005/0131875 A1 | 6/2005 | Riccardi et al. | |
| 2006/0230029 A1* | 10/2006 | Yan | 707/3 |
| 2007/0022103 A1 | 1/2007 | Rys et al. | |
| 2007/0266002 A1* | 11/2007 | Chowdhury et al. | 707/2 |
| 2009/0240675 A1 | 9/2009 | Asai et al. | |
| 2009/0319501 A1 | 12/2009 | Goldstein et al. | |
| 2010/0030896 A1* | 2/2010 | Chandramouli et al. | 709/224 |
| 2010/0106946 A1* | 4/2010 | Imaki et al. | 712/220 |
| 2011/0016160 A1* | 1/2011 | Zhang et al. | 707/805 |
| 2011/0040827 A1* | 2/2011 | Katsunuma et al. | 709/203 |
| 2011/0119270 A1* | 5/2011 | Jin et al. | 707/737 |
| 2011/0173231 A1* | 7/2011 | Drissi et al. | 707/771 |

OTHER PUBLICATIONS

Shah et al., "Flux: An Adaptive Partitioning Operator for Continuous Query Systems", CiteSeer, 2002. Download: http://citeseerx.ist.psu.edu/viewdoc/summary?doi=10.1.1.7.3182.*

* cited by examiner

*Primary Examiner* — Hares Jami
(74) *Attorney, Agent, or Firm* — F. Chau & Associates, LLC; William J. Stock

(57) ABSTRACT

A method of transforming relational queries of a database into on a data processing system includes receiving a series of relational queries, transforming first parts of the queries into a continuous query embodied as a streaming application, sending parameters in second parts of the queries in the series to the streaming application as a data stream, and executing the continuous query based on the received data stream to generate query results for the series of relational queries. Each query in the series includes a first part and a second part. The first parts are a pattern common to all the queries in the series and the second parts each have one or more parameters that are not common to all of the queries in the series.

25 Claims, 11 Drawing Sheets

TRANSFORMING RELATIONAL QUERIES INTO STREAM PROCESSING

ACKNOWLEDGEMENT

This invention was made with United States Government support under Contract No. H98230-07-C-0383, awarded by the United States Intelligence Agencys. The United States Government has certain rights in this invention.

BACKGROUND

1. Technical Field

The present disclosure generally relates to relational queries, and more particularly to transforming relational queries to stream processing.

2. Discussion of Related Art

An application may execute one or more relational queries against a database or a data warehouse in response to continuous receipt of live data. Frequently, the queried data is static, or the application can tolerate slightly-stale data. In this case, the application does not really use the strengths of the database technology, since the data can be periodically pre-computed and has only loose synchronization and locking needs. When data rates and volumes are small, this approach works well, which is why it is widely employed in industry. However, when data volumes and data rates increase, a natural slowdown occurs as database operations become a bottleneck due to disk accesses and transactional semantics.

Since the relational queries go to a traditional disk-based database, in a next approach, one could attempt to reduce the bottleneck by optimizing the disk-based database. However, this approach requires a large engineering effort, and may be hampered by requiring synchronization and transactional guarantees that are not needed by the application. Further, this approach requires slow disk accesses.

In another approach, performance may be improved by use of a materialized view, which is a concrete table that caches the result of a frequent query. When this query is issued again, it is rewritten so it can be serviced by the materialized view instead of the backing database. This approach partially addresses the performance concern, in that queries to the materialized view are faster than the original queries. However, this approach still uses traditional disk-based database technologies, and thus suffers from slow disk accesses.

In yet another approach, which addresses the slow disk issue, one switches to an in-memory database. However, an in-memory database only provides the limited computing power available inside a single computing node. Further, in-memory databases are limited to data volumes that fit in memory on a single computing node.

Streaming workloads and applications gave rise to new data management architectures as well as new principles for application development and evaluation. InfoSphere Streams is a stream processing middleware from IBM that supports structured as well as unstructured data stream processing and the execution of multiple applications from a community of users, simultaneously. These applications can be scaled to a large number of computing nodes and can interact at runtime through stream importing and exporting mechanisms.

InfoSphere Streams applications take the form of dataflow processing graphs. A flow graph consists of a set of operators connected by streams, where each stream has a fixed schema and carries a series of tuples. The operators can be distributed on several computing nodes.

However, conventional relational queries, such as those from the structured query language (SQL), cannot be easily applied to streams. Thus, there is a need for methods and systems that can transform relational queries relational queries into stream processing that can run on platforms such as InfoSphere Streams.

BRIEF SUMMARY

According to an exemplary embodiment of the invention, a method of transforming relational queries of a database into stream processing on a data processing system includes receiving a series of relational queries, transforming first parts of the queries into a continuous query that is embodied as a streaming application, sending parameters in second parts of the queries to the streaming application as a parameter-data stream, and executing the continuous query based on the received parameter-data stream to generate query results for the series of relational queries. Each query in the series includes a first part and a second part. The first parts are a pattern common to all the queries in the series. The second parts each have one or more parameters that are not common to all of the queries in the series. The method may be executed on one or more computing nodes of the system.

According to an exemplary embodiment of the invention, a method of transforming relational queries of a database into stream processing on a data processing system includes receiving a series of relational queries, transforming first parts of the queries into a continuous query, partitioning the continuous query into a partitioned continuous query embodied as a streaming application, sending parameters in second parts of the queries to the streaming application as a data stream, splitting by the partitioned continuous query data of the data stream into at least two separate data streams, and executing the partitioned continuous query based on the at least two split data streams to generate query results for the series of relational queries. Each query in the series includes a first part and a second part. The first parts are a pattern common to all the queries in the series and the second parts each have one or more parameters that are not common to all of the queries in the series. The method may be executed on one or more computing nodes of the system.

According to an exemplary embodiment of the invention, an apparatus comprising a data processing system for transforming relational queries of a database into stream processing is provided. The data processing system includes a memory storing a computer program for generating a streaming application and storing the generated streaming application, and a processor to execute the computer program and the streaming application. The computer program includes instructions for receiving a series of relational queries, transforming first parts of the queries into a continuous query that is embodied as the streaming application, and sending parameters in second parts of the queries to the streaming application as a parameter-data stream. Each query in the series includes a first part and a second part. The first parts are a pattern common to all the queries in the series. The second parts each have one or more parameters that are not common to all of the queries in the series. The streaming application includes instructions for executing the continuous query based on the received parameter-data stream to generate query results. The computer program may be executed on one or more computing nodes of the system.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

At least one embodiment of the invention may improve performance of an application when executing a series of relational queries by exploiting streaming systems and by dropping transactional and persistence support when such is not required by the application. A relational query is a query against a database, which may be expressed by a query statement using various query languages such as the software query language (SQL), the SPARQL Protocol and RDF query language (SPARQL), etc. In a series of relational queries, these queries are issued one by one, each running separately. However, in stream processing, a query runs continuously, by streaming data through the streams of a data flow graph. At least one embodiment of the method achieves high scalability while maintaining fidelity (e.g., faithfully replicating the same results as for the original queries).

Figure 1:
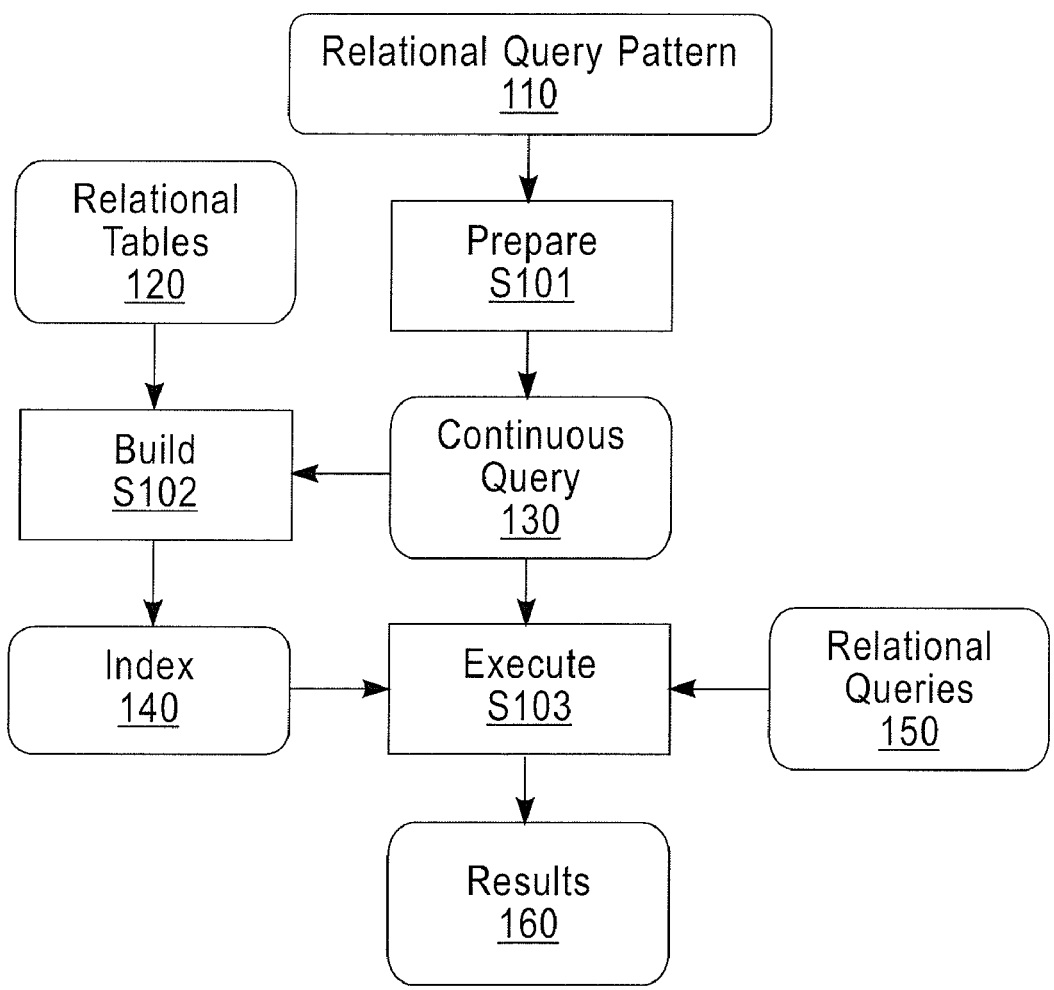
FIG. 1 illustrates a high-level flow chart for a method of transforming relational queries into stream processing according to an exemplary embodiment of the invention.

FIG. 1 illustrates a high-level flow chart for a method of transforming relational queries into stream processing according to an exemplary embodiment of the invention. Referring to FIG. 1, a relational query pattern 110 that is common to a group of relational queries is transformed into a continuous query during a prepare step (S101), an index 140 is built from the continuous query and relational tables 120 of a database during a build index step (S102), and a series of relational 150 queries are executed by sending parameters of each query and the index on streams of the corresponding continuous query during an execute step (S103). The continuous query may be represented as a streaming operator graph. An application that has a series of queries (e.g., SQL, SPARQL statements, etc.) may be analyzed before the application is launched to generate all of the needed continuous queries. Upon launching the application, the index may be built by uploading the relational tables into the streaming operator graph of the corresponding continuous query. For example, the data from the relational tables may be loaded and used to initialize the state of operators of the streaming operator graph. The data may be chosen based on the continuous query.

The continuous query may be written using the continuous query language (CQL), which is a StreamSQL dialect. StreamSQL is a family of SQL-like languages for stream processing. The semantics of CQL are well-specified, reusing the classical relational database operators with their usual meaning. An exemplary embodiment of the invention uses CQL as an intermediate step, because its semantics help retain the meaning of the original relational queries when they are transformed to a continuous query. This retention of query meaning is referred to as fidelity, which is important when making a replacement of database technology by streaming technology acceptable to users.

The above prepare step (S101) transforms the relational query pattern into a continuous query. The relational query pattern is the part that is the same across all the individual queries in the series of relational queries. The part that is different from query to query is a variable, which may be expressed using one or more parameters. The prepare step (S101) may include representing the relational queries as a streaming operator graph by converting the parameter of the series of relational queries into a stream and converting an operator of the relational queries that uses the parameter into a relational Join operator receiving the stream.

An example of the relational query pattern could be "SELECT attributes FROM table WHERE cond (parameter)". In this query pattern, cond (parameter) is a condition, which is a boolean function of parameter and the parameter has a different concrete value for each relational query in the series. In other words, each relational query in the series looks as shown, differing only in the value of the parameter. For example, if the cond is "=" and the parameter is values of 0, 1, and 2, then the query pattern would retrieve attributes from the table of a database that are equal to 0, 1, or 2.

The prepare step (S101) turns the above query pattern into a CQL of "SELECT attributes FROM table, Now (stream-parameter) WHERE cond". The parameter is now an explicit input stream (i.e., stream-parameter) and the operator that uses the parameter is now a join (e.g., referred to as '⋈') instead of a select (e.g., referred to as 'σ'), with two inputs instead of one.

Figure 2A:
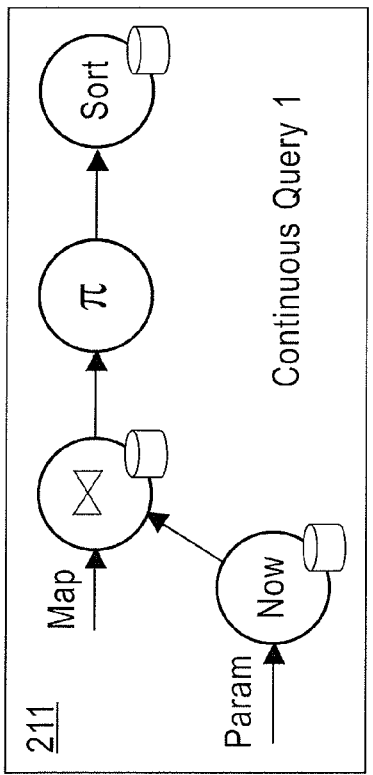
FIGS. 2*a*, 2*b*, and 2*c* respectively show three examples of continuous queries generated by the method of FIG. 1 according to an exemplary embodiment of the invention.
Figure 2A:
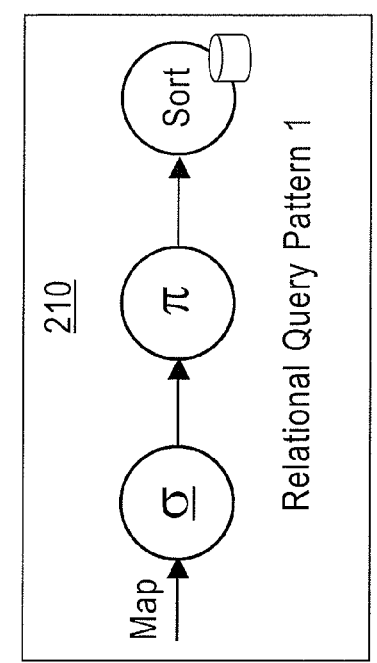
Figure 2B:
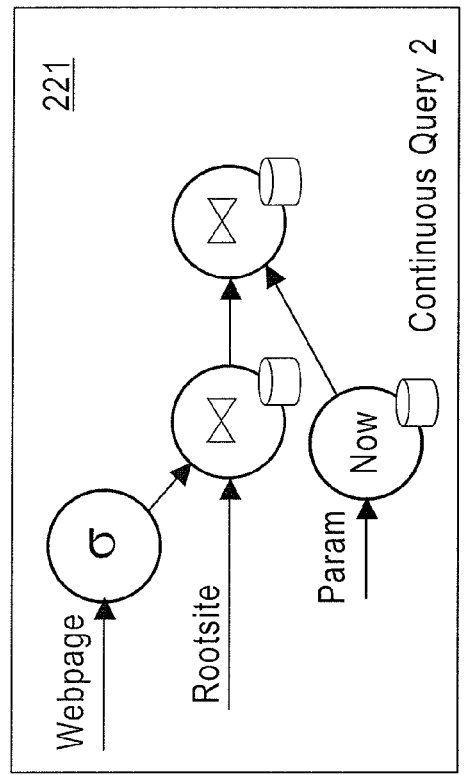
Figure 2B:
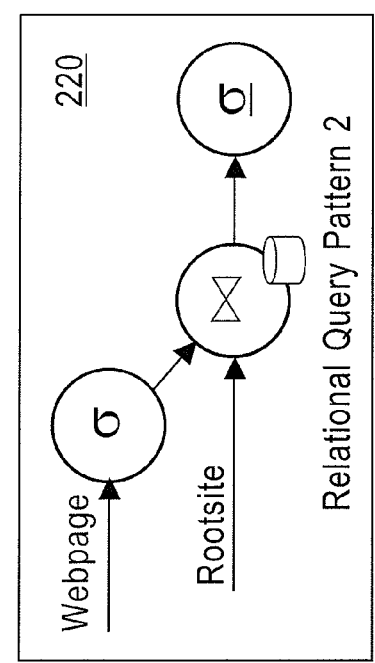
Figure 2C:
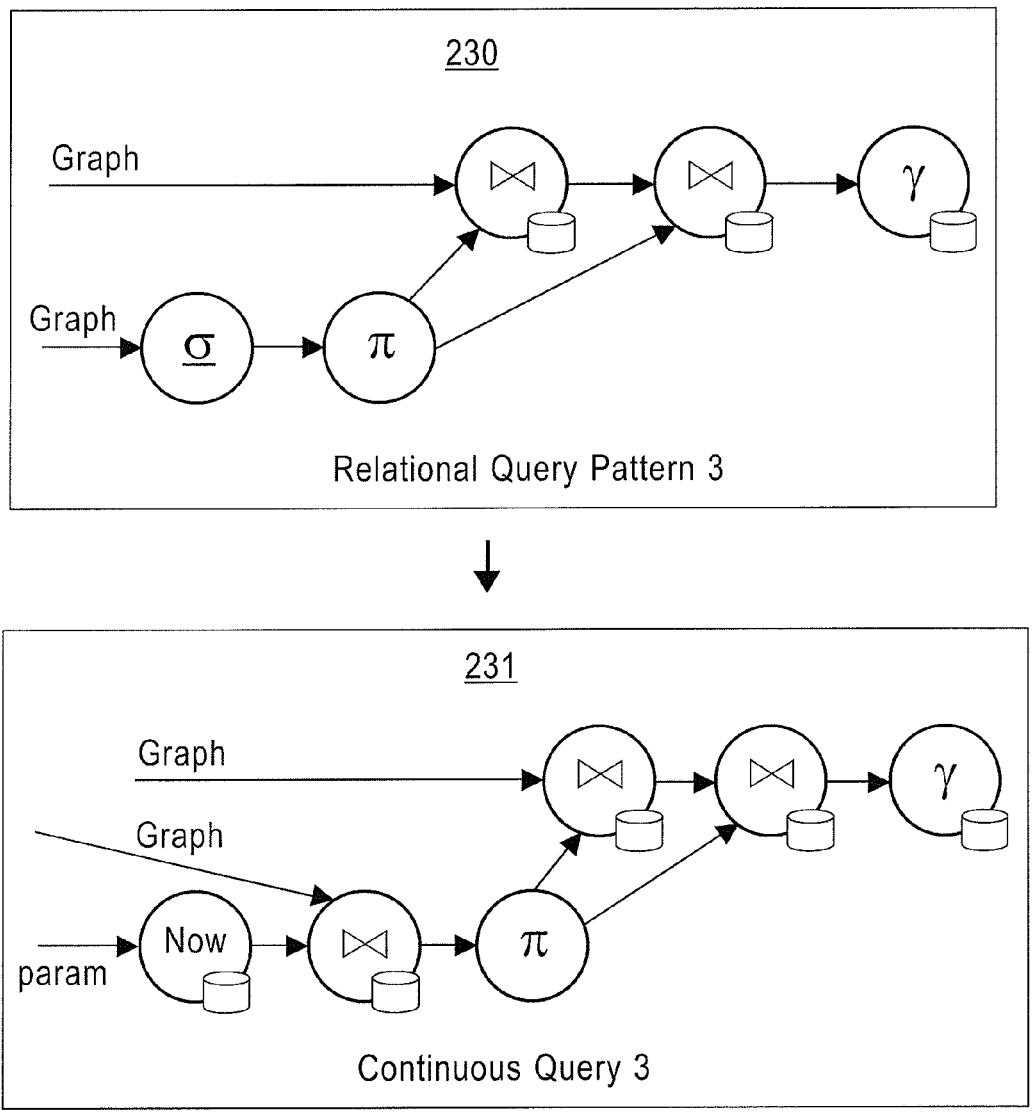

FIGS. 2*a*, 2*b*, and 2*c* respectively show three examples of results of the prepare step (S101) of FIG. 1 according to an exemplary embodiment of the invention. Referring to FIGS. 2*a*, 2*b*, and 2*c*, relational query patterns are represented as operator graphs 210, 220, and 230 and are converted respectively into continuous queries (CQLs) represented as streaming operator graphs 211, 221, and 231, respectively. In each example, the parameterized operator is underlined on the left, and replaced by a join operator '⋈' on the right. For fidelity, the operator graphs of the continuous query 211, 221, and 231 use mostly the same relational operators as before, and vary only to the degree needed to make them continuous. For example in the first relational query pattern shown in FIG. 2*a*, the projection operator (e.g., referred to as 'π') and a sorting parameter are unchanged and only the select operator 'σ' receiving data of the table "map" is replaced with a join operator '⋈' that receives data of the map table and the parameters of the relational queries in a stream. Further, an aggregation operator ('γ') operator is shown in FIG. 2*c*, which can perform a min, max, count, average, etc.

CQL uses logical timestamps, which can be thought of as increasing integers starting from 0. The inputs to each relational operator in CQL are instantaneous relations, which are the snapshot of a relation at a given timestamp. Each relational operator then processes these just like in SQL, i.e., as if the instantaneous relations were database tables. An operator with more than one input is referred to as a confluence operator (e.g., a join operator '⋈'). Confluence operators in CQL match up the instantaneous relations from all their inputs at the identical timestamp, and then produce the output relation at that timestamp.

Figure 3:
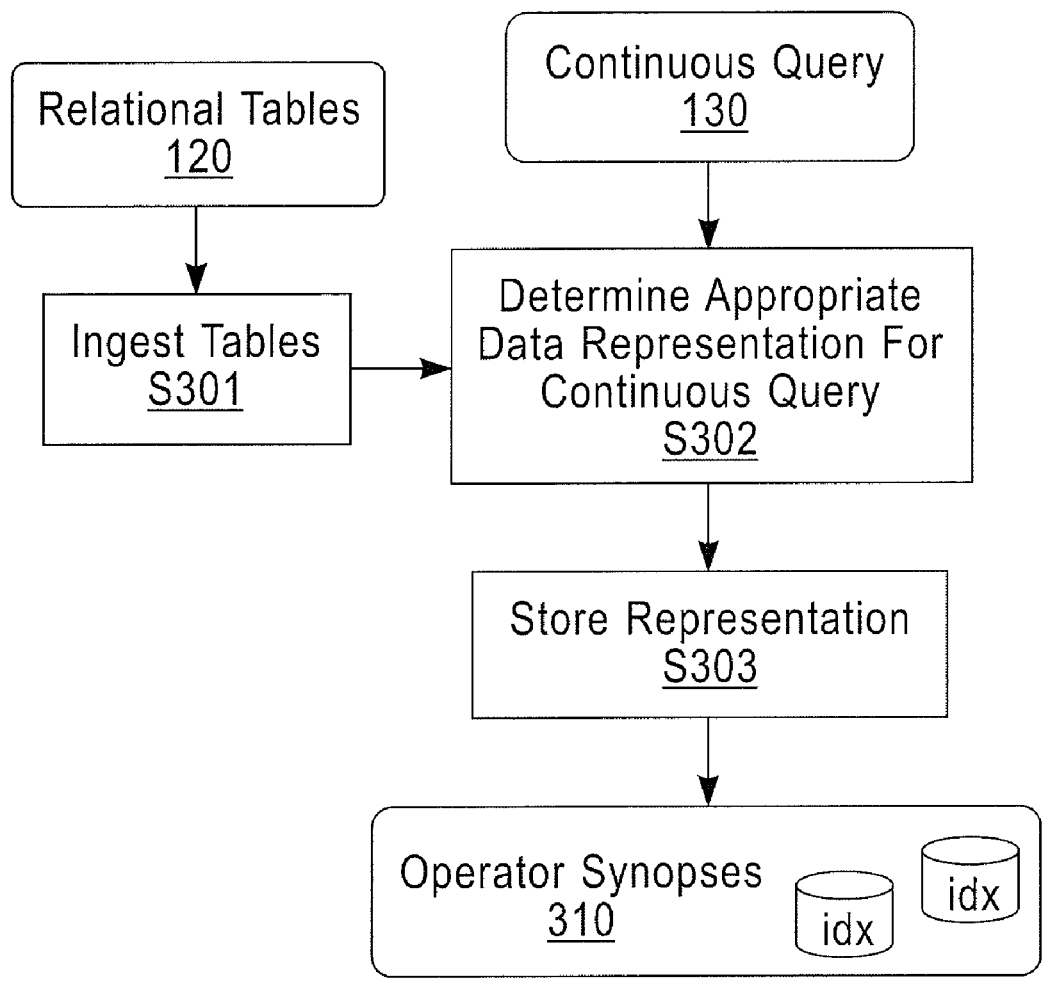
FIG. 3 illustrates a method of generating an index for use by the continuous queries according to an exemplary embodiment of the invention.

FIG. 3 illustrates a method of implementing the build index step (S102) according to an exemplary embodiment of the invention. Referring to FIG. 3, the method includes ingesting the relational tables 120 (S301), determining an appropriate data representation for use by the continuous query 130 (S302), and storing that representation in an operator local state of the continuous query (S303). The method bulk-loads relations (data from the relations/tables) from the database and stores them in an appropriate representation as the initial state of the operators of the continuous query 130. The same operators and the same streaming application can be used for both normal execution and for index building. To do this, one can tag the relations with a timestamp (e.g., 0) and send them along the appropriate streams in the operator graph. For example, in the continuous query operator graph 211 of FIG. 2a, the build index step loads the map relation and sends it on the map edge. The data from the relation flows through the operator graph 211, eventually coming to rest in an operator local state area, which is may be referred to as synopses 310. As another example, in the continuous query operator graph 221 of FIG. 2b, at timestamp 0, webpage relation is first filtered by a select operator, then joined with the rootsite relation, and finally comes to rest in the synopsis of the final join operator, which will later combine it with the parameters during normal execution.

Figure 4:
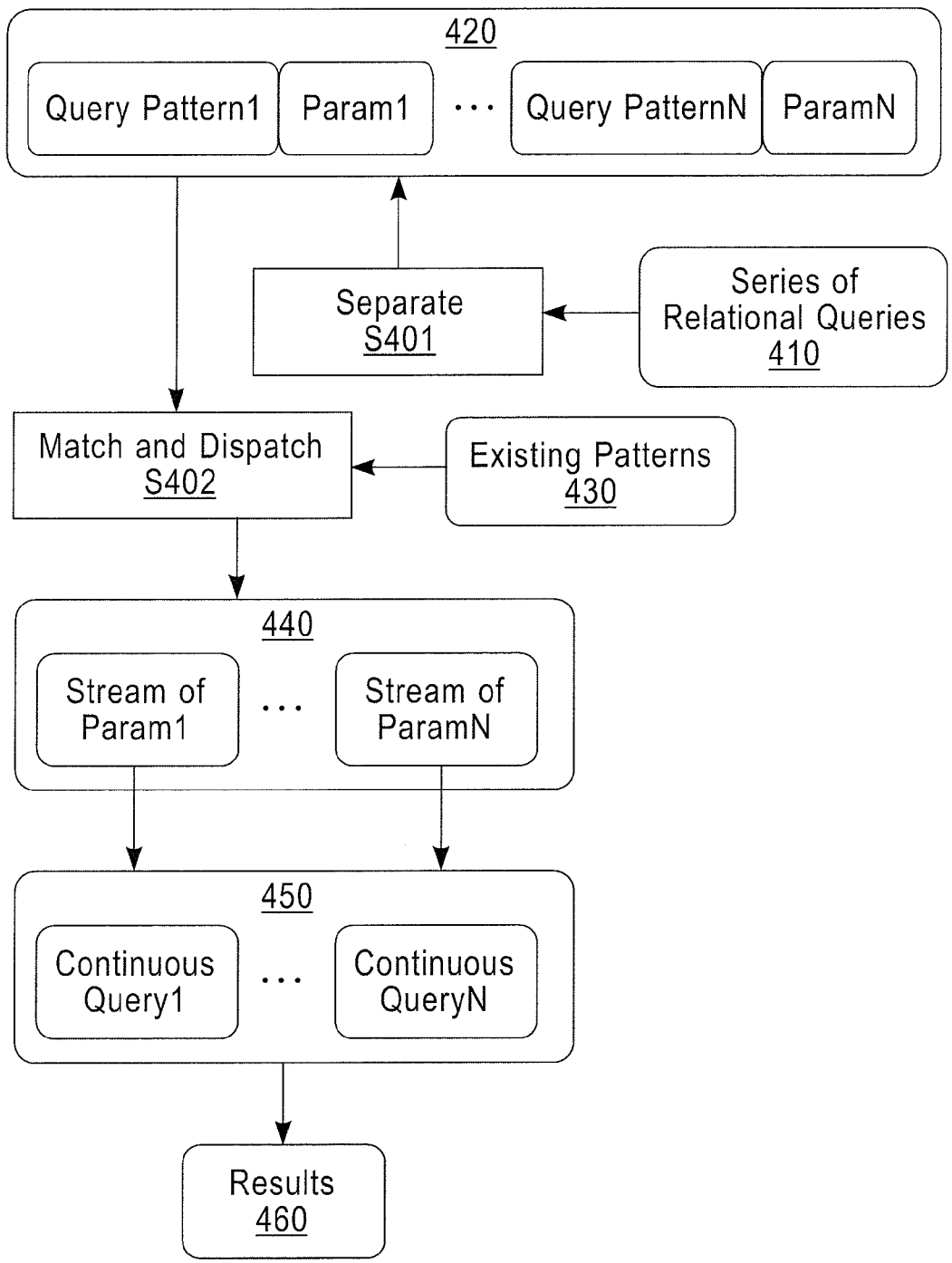
FIG. 4 illustrates a method of executing the continuous queries according to an exemplary embodiment of the invention.

FIG. 4 illustrates a method of implementing the execute step (S103) of FIG. 1 according to an exemplary embodiment of the invention. Referring to FIG. 4, the method includes separating a series of relational queries 410 into relational query patterns and their corresponding parameters 420 (S401). Next, the separated out query patterns 420 are matched with existing query patterns 430, and the corresponding parameters of the separated out query patterns 420 are output as parameter streams 440, and routed to the appropriate one of the continuous queries 450 for execution to produce results 460 (S402).

Over time, some data of the tables of a database change. Accordingly, the local states of operators of a streaming operator graph need to be updated. However, it would be inefficient to periodically send all of the data of the tables to the continuous queries, since only some of the data has changed. One can avoid sending the entire contents of each relation/table periodically by sending only data that has changed in the relation since a last time stamp. A streaming operator graph of a CQL can send one message of data on every edge in the query plan at every time to achieve determinism because confluence operators (i.e., operations with greater than one input edge) wait for input message with matching time stamps. For example, an operator/node receiving data of table1, table2, and table 3, along 3 separate paths for a corresponding join, where data of only table1 and table2 have changed, could receive a message with the changed data along 2 of the paths and an empty message along the remaining path, all with the same timestamp.

However, since index building happens rarely, data on some edges rarely changes, and thus their messages are empty most of the time. Sending those empty messages is wasteful, but in their absence, confluence operators need some other way of determining that all inputs are up to the latest timestamp. An empty message that is not sent may be referred to as phantom message, which can be indicated by a phantom count on a message on the sibling path. For example, in the above example, if data from only table1 and table2 has changed, a message including the changed data for table1 and a phantom count of 1 could be sent along the first path, while no message is sent along the third path. Thus, the operator can perform its join as soon as it receives the changed data of table2. Alternately, the data of table2 (i.e., data that has changed for table 2 and the phantom count (e.g., 1)) could have arrived first along the second path. In this example, the operator can perform its join as soon as it receives the changed data for table1.

Figure 5:
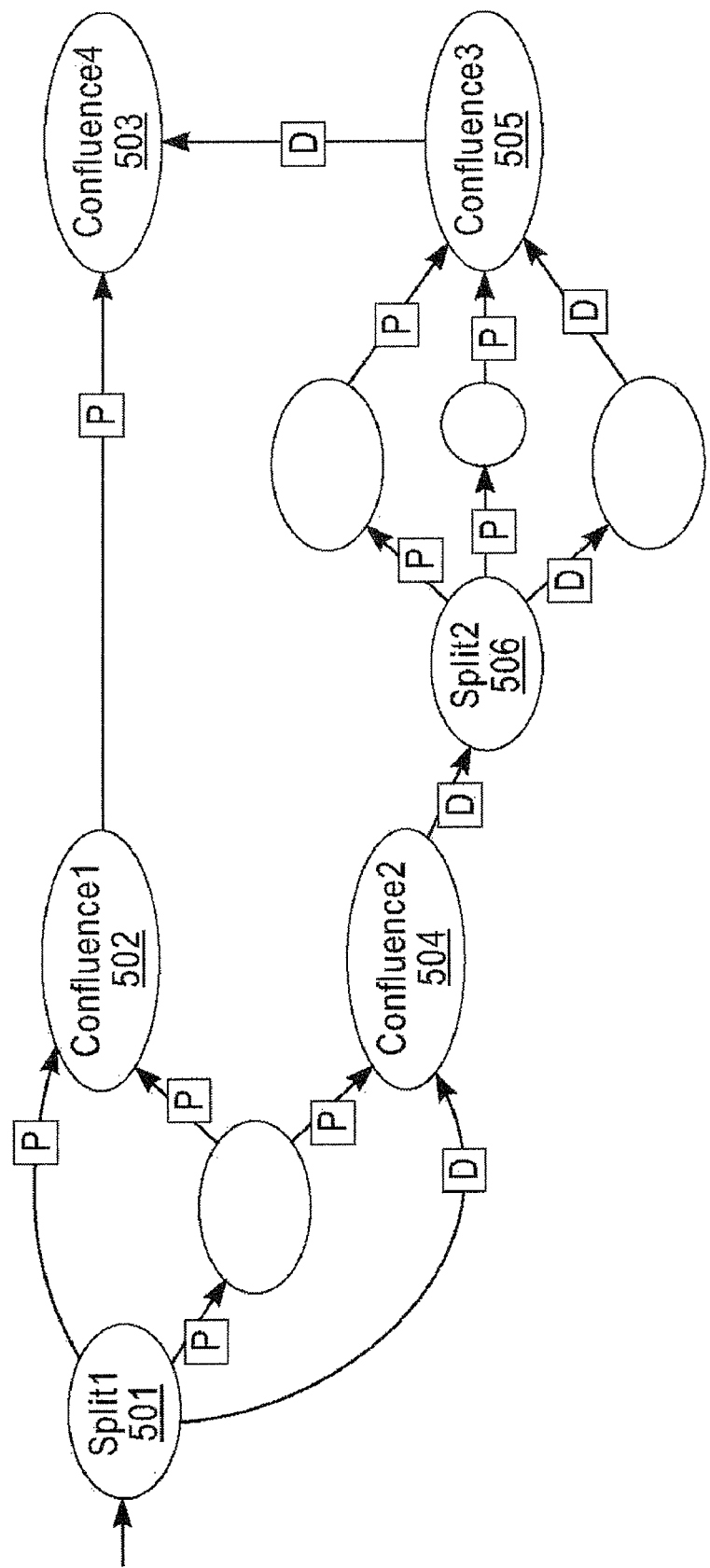
FIG. 5 illustrates an example of a graph of a continuous query, which makes use of phantom counts according to an exemplary embodiment of the invention.

FIG. 5 shows an example of a graph of a continuous query, with edges labeled with either 'P' for phantom or 'D' for data, and including operators 501, 502, 503, 504, 505, 506, etc. FIG. 5 illustrates the messages sent for a single timestamp. Each 'D' message carries a table indicating, for each confluence operator, the number of phantom data items arriving at this confluence operator at a particular timestamp. For example, a table entry for operator Confluence2 504 might be {1:_, 2:1, 3:?, 4:1}. This notation lists for confluence operators1-4 502-505 either the number of phantoms sent to it, or a '–' for a "don't-care" or "?" for "unknown". When operator Confluence2 504 receives the 'D' message, it sees from the table entry "2:1" that there is 1 'P' message, bringing the total count to 2 (i.e., 1 D message+1 P message=2). Therefore, operator Confluence2 504 has logically received all the messages it expected (e.g., 2), and proceeds with producing an output for this timestamp. As another example, the data item arriving at operator Confluence3 505 would include the phantom count table {1:_, 2:_, 3: 2, 4: 1}. Since the entry "3:2" indicates two phantom messages, the total is brought to 3 (i.e., 1 D message+2 P messages), which is all that this confluence operator expected, so it proceeds to producing an output for this timestamp. Note that these semantics work uniformly during both index building and normal execution, where index building may occur at, for example, timestamp 0, and data travels through the same operator graph along different paths.

Figure 6:
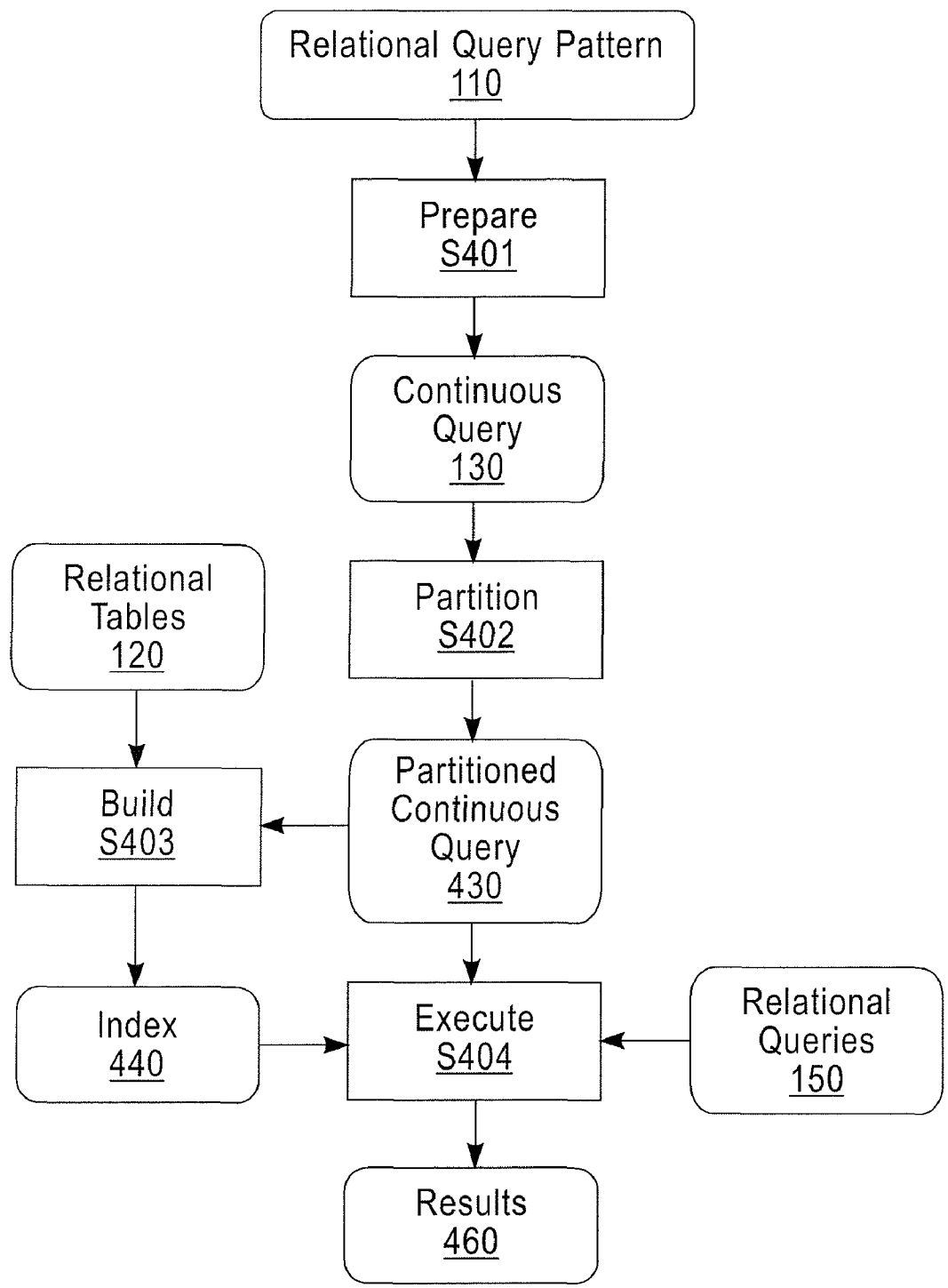
FIG. 6 illustrates a high-level flow chart for a method of transforming relational queries into stream processing using partitioning according to an exemplary embodiment of the invention.

An alternate embodiment of the invention results in increased scalability by applying an additional partitioning step. The partitioning step introduces data parallelism and reduces the amount of data that needs to be stored at each individual computing node, thereby avoiding the latency for disk accesses by keeping more data in-memory. FIG. 6 illustrates a high-level flow chart for a method of transforming relational queries into stream processing using partitioning according to an exemplary embodiment of the invention. The prepare step (S401) of FIG. 6 is similar to the prepare step (S101) of FIG. 1. Next, the method performs a partitioning of a continuous query 130 into a partitioned continuous query 430 (S402). The remaining steps (e.g., build index S403 and execute S404) are similar to those of FIG. 1, but now work on the partitioned continuous query 430 instead of the original continuous query 130.

Figure 7A:
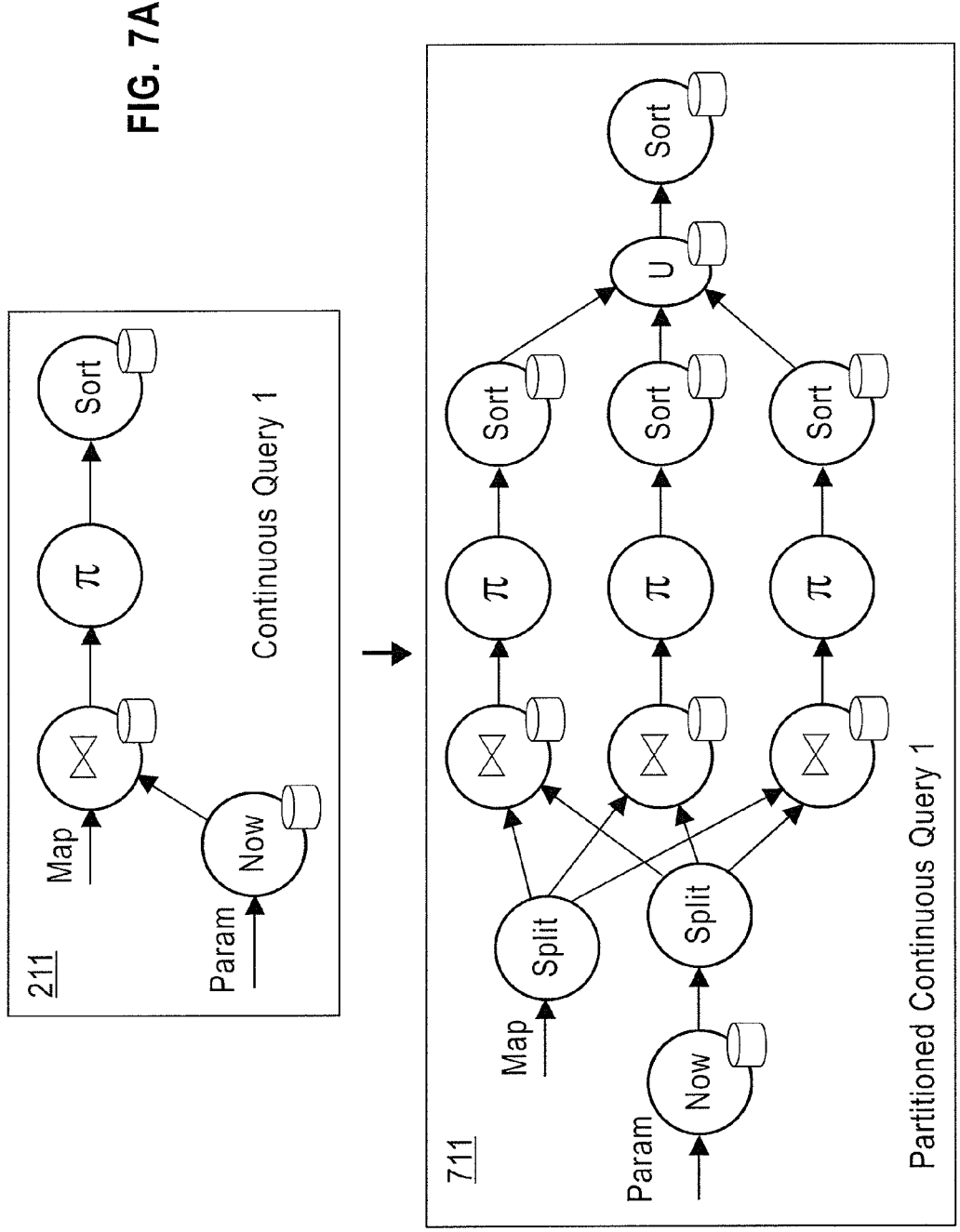
FIGS. 7*a*, 7*b*, and 7*c* respectively show three examples of partitioned continuous queries generated by the method of FIG. 6 according to an exemplary embodiment of the invention.
Figure 7B:
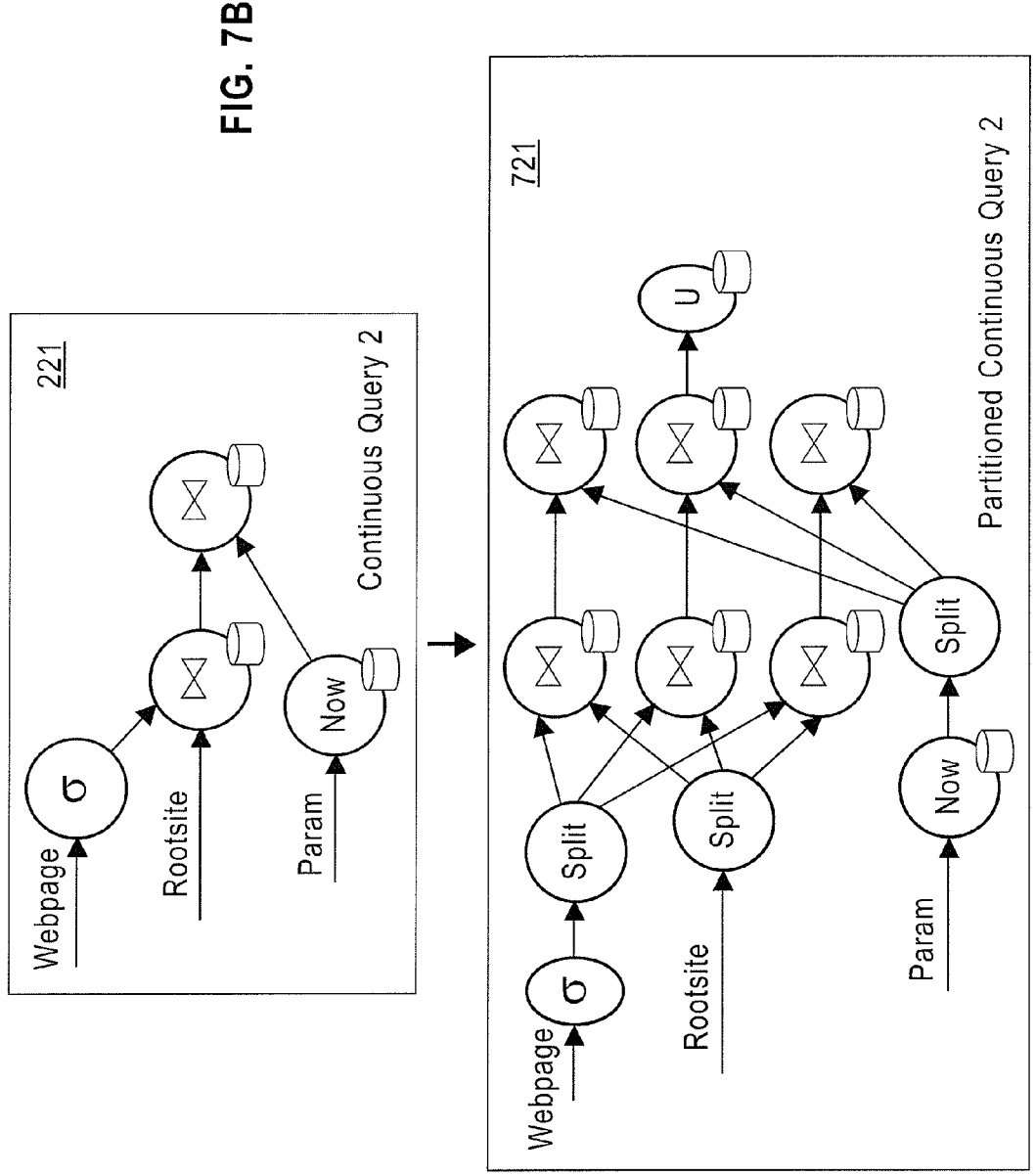
Figure 7C:
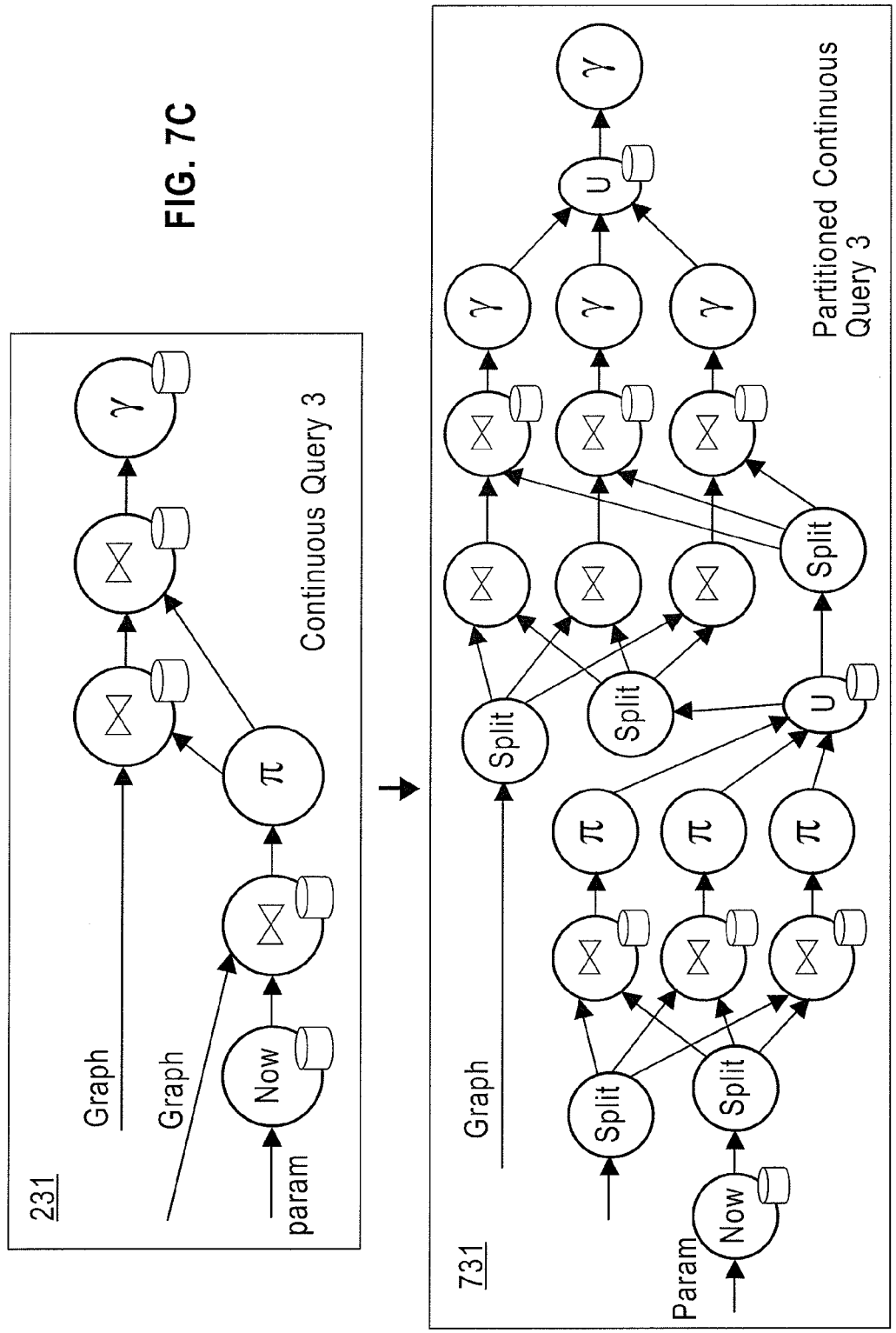

The step of partitioning (S402) may be performed by sub-steps of splitting the continuous query 130 based on a primary key and duplicating sub-graphs beyond the point of the splitting. The primary key of a relational table uniquely identifies each record in the table. FIGS. 7a-7c illustrates examples of partitioned continuous queries generated using the sub-steps. The continuous queries 211, 221, and 231 of FIGS. 2a-c, reproduced on the left in FIGS. 7a-c, respectively, are converted into corresponding partitioned continuous queries 711, 721, and 731 on the right in FIGS. 7a-c, respectively. In these examples, the "Split" operator always partitions the data 3-ways. However, this technique may be applied to N-way splits, where N is less than 2 or greater than 3. After each split, a duplicated sub-graph is present, which is replicated N times (e.g., here 3 times). The duplicated sub-graphs are then recombined using a union operator ("U") and then resorted (e.g., see last sort operator in FIG. 7A) or re-aggregated (e.g., see last aggregation operator 'γ' in FIG. 7c) if necessary.

The "Split" operator may be a hash-split operator. For each CQL timestamp, the hash-split operator receives one data item on its input, and produces one data item on each of its outputs with the same timestamp. Due to hashing, each data item has the rows for a disjoint partition of the primary key space. For example, if the input data item has 10 rows, then there might be three output data items with 3, 7, and 0 rows. Using the above-described phantom data item optimization, the "Split" operator does not send empty data items, and instead sets the phantom count in a variable or a table that it sends along with the non-empty data items. In these examples, the phantom counts are set to 1, since one data item is a phantom. The end result of the partitioning step is increased scalability. While the continuous query already yields pipeline parallelism, the partitioned continuous query adds data parallelism, and further reduces the synopsis sizes so data fits in main memory of the computing nodes. The partitioning step also maintains fidelity since the continuous query behaves the same as the original series of relational queries, and the partitioned continuous query behaves the same as the continuous query.

Figure 8:
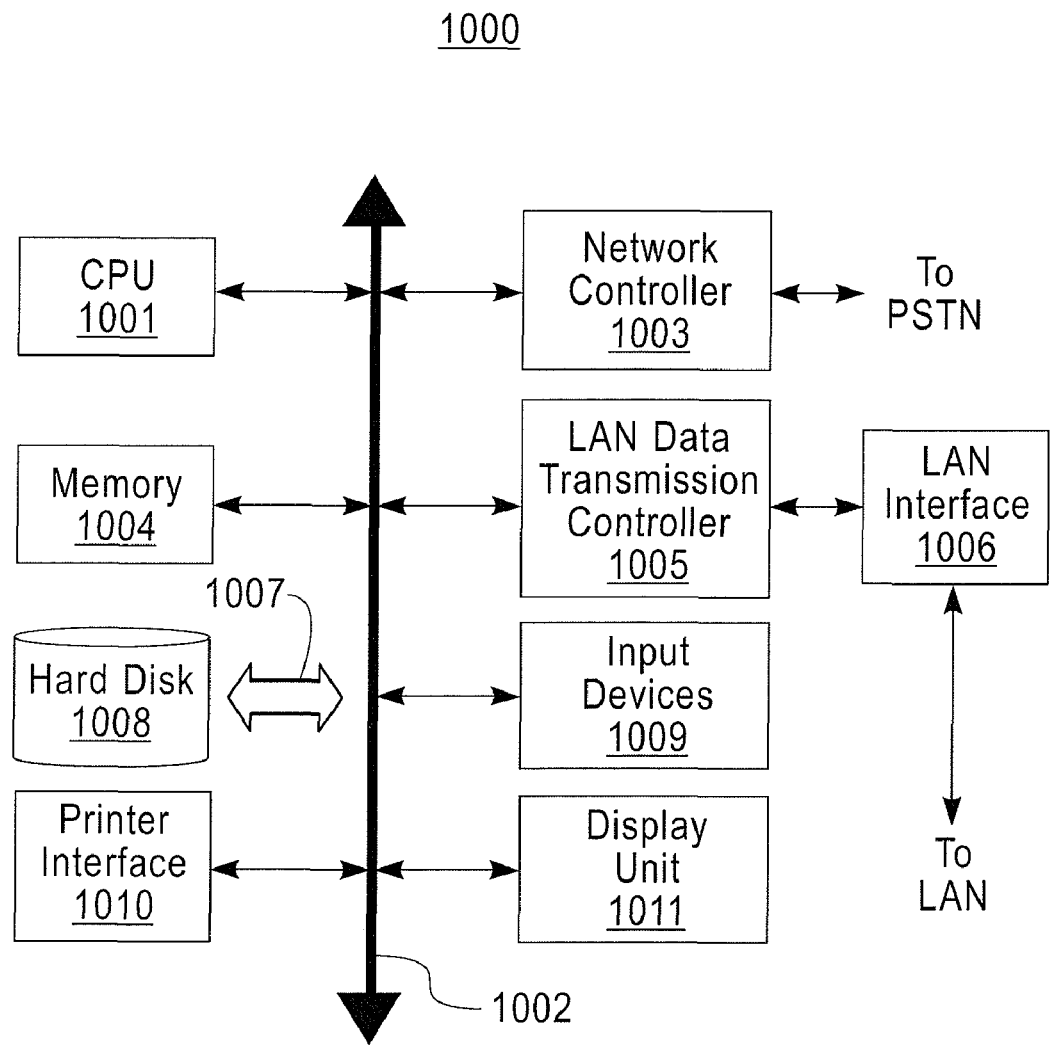
FIG. 8 is shows an example of a computer system capable of implementing the methods according to embodiments of the invention.

FIG. 8 illustrates an example of a computer system, which may execute any of the above-described methods, according to exemplary embodiments of the invention. For example, the methods of FIGS. 1, 3, 4, and 6 may be implemented in the form of a software application running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. The display unit 1011 may display results of any of the above-described queries. As shown, the system 1000 may be connected to a data storage device, for example, a hard disk 1008, via a link 1007. CPU 1001 may be the computer processor that performs the above described methods (e.g., those of FIGS. 1, 3, 4, and 6). One or more nodes of any of the above-described streaming operator graphs may correspond to a system like that of system 1000. For example, each node or several nodes of the continuous queries of FIGS. 2a-2c and FIG. 5, or each node or several nodes of the partitioned continuous queries of FIGS. 7a-7c may correspond to a system like that of system 1000.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

It is to be understood that the systems and methods described above may be implemented in various forms of hardware, software, firmware, special purpose processors, or a combination thereof. In particular, at least a portion of the present invention is preferably implemented as an application comprising program instructions that are tangibly embodied on one or more computer readable medium(s) (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of transforming relational queries of a database into stream processing on a data processing system, the method comprising:
    receiving a series of relational database queries that are configured to be executed against a relational database;
    separating each query into a relational query pattern common to all the queries and a parameter that is not common to all the queries;
    transforming the relational query pattern into a continuous query that is embodied as a streaming application;
    sending the parameter to the streaming application as a data stream; and
    executing, by a processor, the continuous query against a relational database of a computer system based on the received data stream to generate query results for the series of relational queries.

2. The method of claim 1, wherein the transforming comprises comprises:
    loading data of tables of a database based on the continuous query;
    sending the data to the streaming application as a second data stream; and
    initializing operators of the continuous query using data of the second data stream.

3. The method of claim 2, further comprising:
    determining whether a part of the loaded data has changed in the database;
    updating the second data stream to include only the changed part and a corresponding count;
    sending the updated data stream to the steaming application; and
    performing, by an operator of the continuous query, an operation using the changed part when it is determined from the count that all needed changes have been received.

4. The method of claim 3, wherein the operator has at least two inputs, the count is a number of the at least two inputs for which data is unchanged, and the operator performs the operation as soon as data is received on the other inputs.

5. The method of claim 2, wherein the transforming comprises:
    representing the relational query pattern as a graph of operators; and
    converting an operator of the graph that uses the parameter into a join operator.

6. The method of claim 5, wherein the join operator receives the data stream and the second data stream.

7. The method of claim 1, wherein prior to the executing, the method comprises:
    loading data of tables of a relational database based on the continuous query;
    determining whether a part of the loaded data has changed in the database;
    generating a second data stream to include only the changed part and a corresponding count; and
    sending the second data stream to the steaming application, wherein the executing is performed when it is determined from the count in the second data stream that all needed changes have been received.

8. A method of transforming relational queries of a database into stream processing on a data processing system, the method comprising:
    receiving a series of relational database queries that are configured to be executed against a relational database;
    separating each query into a relational query pattern common to all the queries and a parameter that is not common to all the queries;
    transforming the relational query pattern into a continuous query;
    partitioning the continuous query into a partitioned continuous query embodied as a streaming application;
    sending the parameter to the streaming application as a data stream;
    splitting, by the partitioned continuous query, data of the data stream into at least two separate data streams; and
    executing, by a processor, the partitioned continuous query against a relational database of a computer system based on the at least two split data streams to generate query results for the series of relational queries.

9. The method of claim 8, wherein transforming the relational query pattern comprises building an index to a distributed copy of a database that is accessible by the streaming application.

10. The method of claim 8, wherein the transforming comprises:
loading data of tables of a database based on the continuous query;
sending the data to the streaming application as a second data stream;
splitting the second data stream into at least two separate other data streams; and
initializing operators of the partitioned continuous query using data of the at least two other split data streams.

11. The method of claim 10, further comprising:
determining whether a part of the loaded data has changed in the database;
updating the second data stream to include only the changed part and a corresponding count;
sending the updated data stream to the steaming application; and
performing, by an operator of the continuous query, an operation using the changed part when it is determined from the count that all needed changes have been received.

12. The method of claim 11, wherein the operator has at least two inputs, wherein the count is a number of the at least two inputs for which data is unchanged, and the operator performs the operation as soon as data is received on the other inputs.

13. The method of claim 10, wherein the transforming comprises:
representing the relational query pattern as a graph of operators; and
converting an operator of the graph that uses the parameter into a join operator.

14. The method of claim 13, wherein the join operator receives the data stream and the second data stream.

15. The method of claim 14, wherein the partitioning comprises:
duplicating sub-graphs of the graph beginning from the join operator; and
adding split operators to the graph to generate the split data streams and the other split data streams for output to the duplicated sub-graphs.

16. The method of claim 15, wherein the split operators perform the splitting based on a primary key of a table of the database.

17. A non-transitory computer readable storage medium embodying instructions executable by a processor to perform method steps for transforming relational queries of a database into stream processing, the method steps comprising instructions for:
receiving a series of relational database queries that are configured to be executed against a relational database;
separating each query into a relational query pattern common to all the queries and a parameter that is not common to all the queries;
transforming the relational query pattern into a continuous query embodied as a streaming application;
sending the parameter to the streaming application as a data stream; and
executing the continuous query based on the received data stream to generate query results for the series of relational queries.

18. The computer readable storage medium of claim 17, wherein the transforming comprises:
loading data of tables of a database based on the continuous query;
sending the data to the streaming application as a second data stream; and
initializing operators of the continuous query using data of the second data stream.

19. The computer readable storage medium of 18, wherein the method steps further comprise instructions for:
determining whether a part of the loaded data has changed in the database;
updating the second data stream to include only the changed part and a corresponding count;
sending the updated data stream to the steaming application; and
performing, by an operator of the continuous query, an operation using the changed part when it is determined from the count that all needed changes have been received.

20. The computer readable storage medium of claim 19, wherein the operator has at least two inputs, wherein the count is a number of the at least two inputs for which data is unchanged, and the operator performs the operation as soon as data is received on the other inputs.

21. The computer readable storage medium of claim 17, wherein prior to the executing, the method steps comprises instructions for:
loading data of tables of a relational database based on the continuous query;
determining whether a part of the loaded data has changed in the database;
generating a second data stream to include only the changed part and a corresponding count; and
sending the second data stream to the steaming application, wherein the executing is performed when it is determined from the count in the second data stream that all needed changes have been received.

22. A non-transitory computer readable storage medium embodying instructions executable by a processor to perform method steps for transforming relational queries of a database into stream processing, the method steps comprising instructions for:
receiving a series of relational database queries that are configured to be executed against a relational database;
separating each query into a relational query pattern common to all the queries and a parameter that is not common to all the queries;
transforming the relational query pattern into a continuous query;
partitioning the continuous query into a partitioned continuous query embodied as a streaming application;
sending the parameter to the streaming application as a data stream;
splitting, by the partitioned continuous query, data of the data stream into at least two separate data streams; and
executing the partitioned continuous query based on the at least two split data streams to generate query results for the series of relational queries.

23. The computer readable storage medium of claim 22, wherein transforming the relational query pattern comprises building an index to a distributed copy of a database that is accessible by the streaming application.

24. The computer readable storage medium of claim 22, wherein the transforming comprises:
loading data of tables of the database based on the continuous query;

sending the data to the streaming application as a second data stream;
splitting the second data stream into at least two separate other data streams; and
initializing operators of the partitioned continuous query using data of the at least two other split data streams.

25. The computer readable storage medium of claim 24, wherein the method steps further comprise instructions for:
determining whether a part of the loaded data has changed in the database;
updating the second data stream to include only the changed part and a corresponding count;
sending the updated data stream to the steaming application; and
performing, by an operator of the continuous query, an operation using the changed part when it is determined from the count that all needed changes have been received.

* * * * *